United States Patent Office 3,147,590
Patented Sept. 8, 1964

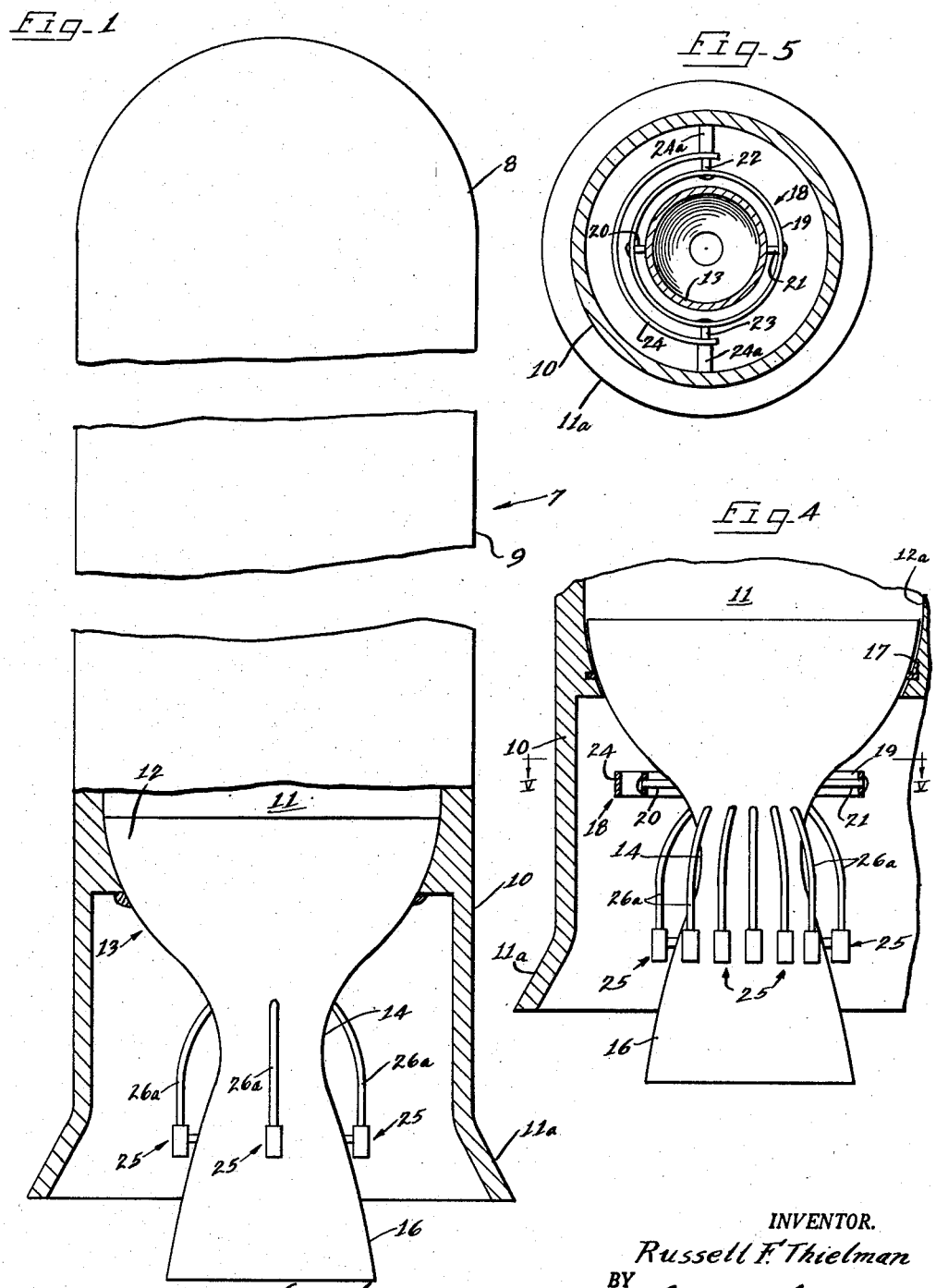

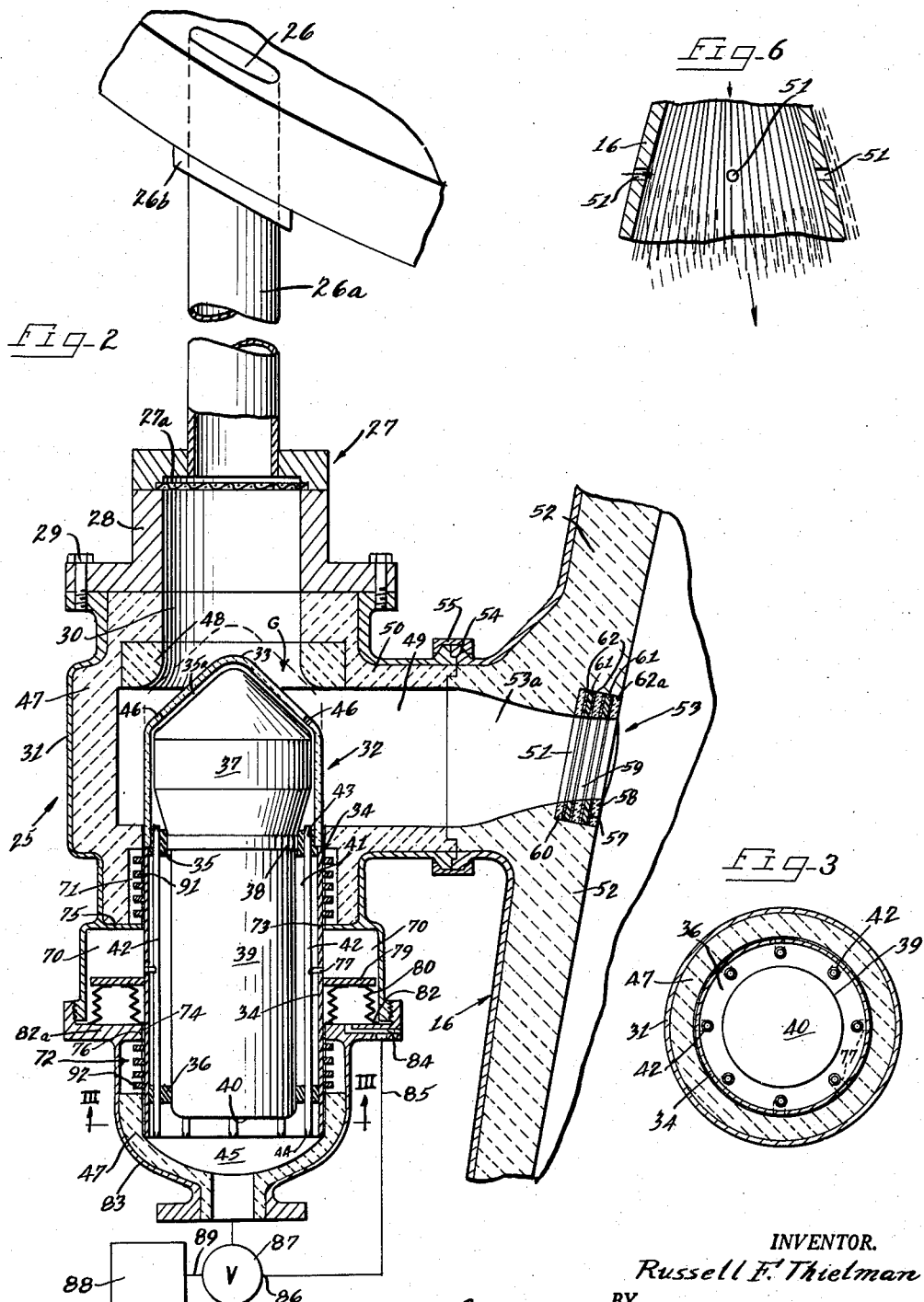

3,147,590
REACTION MOTOR WITH NOZZLE VECTOR CONTROL HAVING ABLATIVE PORT MEANS AND COOLED VALVE MEANS
Russell F. Thielman, Cleveland, Ohio, assignor to Thompson Ramo Wooldridge Inc., Cleveland, Ohio, a corporation of Ohio
Filed Mar. 16, 1961, Ser. No. 96,201
4 Claims. (Cl. 60—35.54)

This invention relates to air and space borne vehicles, such as missiles, rockets, satellites, nose cones and the like, and is more particularly directed to improved methods and means for controlling the attitude of such a vehicle in flight.

Heretofore, it has been customary to employ gimbaled nozzles and reaction motors, refractory vanes positioned in the exhaust gas path from the reaction motor nozzle, and exterior vanes on the vehicle for controlling the attitude of the vehicle in the pitch, yaw and roll planes. These auxiliary components were quite complicated and increased the weight of the vehicle considerably.

Difficulty has been encountered in utilizing the exhaust gases of the primary or main thrust producing reaction motor or motors of such vehicles because of the extremely high temperatures of such exhaust gases. The state of the art relating to materials of construction for such vehicles has not kept pace in development of materials capable of handling such exhaust gases at temperatures including plus 6000° F. for extended periods of time.

In addition to the temperature problem, solid particles or impurities were found in solid propellants and were sometimes intentionally added to liquid oxidizer or fuel components to promote burning of this fuel and therefore presented problems of filtering hot exhaust gases which have heretofore prevented efficient utilization of such exhaust gases.

As far as I am aware, effective means have as yet not been provided for handling the hot exhaust gases emitting from the main thrust producing reaction motor or motors of air and space borne vehicles for subsequent utilization.

By employment of the present invention, I substantially overcome the problems and difficulties of the prior art and permit cooling and efficient utilization of a portion of the exhaust gases emitting from the main or primary reaction motor of an air or space borne vehicle for operating auxiliary power components of the vehicle with which the reaction motor is employed. In accordance with the practice of the present invention, a portion of the exhaust gases are bled from the primary flow of exhaust gases from the discharge nozzle to control the attitude of the vehicle in the pitch and yaw planes.

It is therefore an object of the present invention to provide a system wherein the temperature of a portion of the exhaust gases emanating from the main or primary reaction motor or motors of an air or space borne vehicle may be reduced to levels permitting employment thereof with auxiliary components constructed of readily available material.

Another object of the present invention is to provide an improved thrust vector control system wherein a portion of the main reaction motor exhaust gases are bled, cooled and filtered for by-passing thereof to the exit portion of the gas exhaust nozzle for introduction thereof into the main exhaust gas stream to thereby create shock waves changing the direction of the thrust vector of the main body of exhausting gases.

Still another object of the present invention is to provide an improved thrust control device employing cooled and filtered exhaust gases to change the direction of the thrust vector of the exhaust gases flowing from the exhaust nozzle of the main reaction motor or motors of an air or space borne vehicle.

A further object of the present invention is to provide automatic valve means operatively responsive to cooled and filtered exhaust gases of the main reaction motor.

Another object of the present invention is to provide improved methods and means for cooling a portion of the exhaust gases emanating from the main reaction chamber of an air or space borne vehicle for subsequent utilization thereof.

Still another object of the present invention is to provide improved methods for controlling the direction of the thrust vector of the exhaust gases providing the thrust for air or space borne vehicles.

These and other objects, features and advantages of the present invention will become readily apparent from a careful consideration of the following detailed description when considered in conjunction with the accompanying drawing illustrating preferred embodiments of the present invention and wherein like reference numerals and characters refer to like and corresponding parts throughout the several views.

On the drawings:

FIGURE 1 is a fragmentary view in partial section of an air or space borne vehicle constructed in accordance with the principles of the present invention.

FIGURE 2 is an enlarged fragmentary view in partial section illustrating the details of the thrust vector control system of FIGURE 1.

FIGURE 3 is a view taken along lines III—III of FIGURE 2.

FIGURE 4 is an alternative embodiment of a thrust vector control system of the present invention.

FIGURE 5 is a view taken along lines V—V of FIGURE 4.

FIGURE 6 is a generally schematic view illustrating a representative change in thrust vector direction of the present invention.

As shown on the drawings:

Briefly stated, the present invention includes means for by-passing a portion of the hot exhaust gases from the discharge nozzle of the main reaction motor of an air or space borne vehicle, filtering the hot exhaust gases which have been by-passed, cooling the bled exhaust gases by mixing the gases with a cooling fluid, such as a nitrogen gas, and flowing the cooled mixture of exhaust gases and cooling gas through a port formed in the gas discharge nozzle of the reaction motor in a direction transverse to the direction of flow of the primary flow of exhaust gases to thereby create oblique or transverse shock waves and thereby change the direction of the thrust vector of the primary flow of exhaust gases whereby the attitude of the vehicle may be changed in either the pitch or yaw planes.

Although the present invention has a variety of applications, the preferred embodiment thereof appearing in FIGURE 1 includes an air or space borne vehicle, generally indicated by the numeral 7, having a generally conical nose or front end portion 8, an elongated cylindrical body portion 9 housing the guidance and related components (not shown) of the vehicle, and an end or discharge portion 10 which may be provided with an outwardly flaring lip 11a. The reaction chamber 11 of the vehicle communicates with an exhaust gas entrance portion 12 of the gas discharge nozzle 13. The nozzle 13 is of the De Laval type, is formed integral with the reaction chamber 11 and includes a throat portion 14 and a divergent exhaust gas exit portion 16.

The exhaust nozzle 13, when formed integral with the reaction chamber 11 simplifies the construction and fabrication problems associated with the design of the overall vehicle. The requirements for close tolerance fits, expansion and contraction ratio determinations of materials of construction of separate nozzle and reaction chambers, of employment of bellows and other seals, gimbal mechanisms, and the like, may be substantially eliminated by employment of the attitude control system of the present invention. These design problems have currently caused considerable difficulty in establishing design standards, added to the weight of the vehicle, and required cowling apparatus presenting aerodynamic stability problems.

Heretofore, the auto pilot system of air and space borne vehicles controlled several servomechanisms which changed the orientation of gimbaled nozzles, reaction motors, jet vanes and the like for controlling the attitude of the vehicle. With my invention, exhaust gases flowing through the inlet portion 12 of the nozzle 13 are employed and mixed with a coolant, such as nitrogen gas, as is more fully hereinafter explained.

As appears in FIGURE 2, a plurality of exhaust gas thrust devices, generally indicated by the numeral 25, may be located on the exterior of the reaction motor nozzle 13. Four such devices 25 may be arranged around the nozzle and located 90° apart (FIGURE 1).

The nozzle entrance portion 12 is apertured as at 26 and communicates with a conduit 26a connected as by a fitting 26b to the wall of the nozzle. The conduit 26a supplies bled exhaust gases to a screening device 27. The housing of the screening device 27 may be of general cylindrical configuration and includes a screen 27a for filtering solid particles, such as aluminum particles employed in the fuel for promoting burning thereof. The screen 27a separates the housing into an inlet chamber and outlet chamber. The outlet chamber of the housing 27 communicates with a conduit 28 connected as at 29 to an inlet conduit 30 of the thrust control device 25.

The housing 31 of the thrust control device 25 is bored to receive a plunger valve member 32. The plunger 32 includes a refractory valve head 33 and attached sleeve body 34 which is opened at its end opposite the head 33. Housed by the plunger 32 in spaced relation thereto and supported by spaced flanges 35 and 36 is an internal head 37 connected as at 38 to a plastic sleeve body 39 which may be closed at its end 40 remote from the head. The sleeve 39 and head 37 cooperate with the refractory head 33 and sleeve 32 to define a chamber 41.

Supported in chamber 41 are a plurality of annularly arranged and spaced flow tubes 42 (FIGURE 3) having fixed restrictions 43 and 44 at opposed ends thereof. The support 35 adjacent the heads 33 and 37 cooperate with the heads 33 and 37 to define an annular flow passage into which a cooling and pressurizing fluid may be introduced from a plenum chamber 45 located adjacent the open end of the sleeve 34. Thus, when the plunger is in the position shown in FIGURE 2, the cooling medium will flow through the axial tubes 42 into the chamber 35a defined by the heads 33 and 37 and out a plurality of annularly arranged apertures 46 formed in the outer head 33 for mixing with the hot exhaust gases flowing into the housing bore from the inlet passage 30.

The inlet 30 may be provided with a liner 47 of refractory material and a removable valve seat 48 sized to the plunger head 33. The apertures 46 are located in the plunger head 33 at positions wherein they impinge cooling gas on the valve seat when the plunger is in the position shown by the dotted lines in FIGURE 2 blocking flow of exhaust gases from the inlet passage 30 thereby cooling the valve seat 48.

When the plunger head 33 is in the position shown in the full lines in FIGURE 2 the cooled mixture of exhaust gases and coolant fluid flow into a passage 49 which may be provided with an insulated liner 50 into a venturi discharge nozzle 51 formed in the wall 52 of the nozzle exit portion 16. Thus, means are provided for flowing a cooled mixture of filtered exhaust gases and a cooling medium into the interior of the nozzle. The outlet 53 of the venturi nozzle 51 is preferably formed in the wall 52 at a substantially right angle to the primary or main flow of exhaust gases emanating from the nozzle exit portion 16. In this manner, the cooled mixture of exhaust gases and cooling gases flow into the nozzle through the outlet 53 and create oblique shock waves transverse to the direction of the primary flow of the main body of exhaust gases emanating from the nozzle and change the direction of the mean thrust vector of the exhaust gases and thus the attitude of the vehicle in the desired direction in the pitch and yaw planes.

The thrust control device 25 is preferably connected to a fitting 54 of the nozzle wall as by a clamp 55.

The thrust control device 25 is non-modulating preferably and in the open position has a constant pressure drop across the valve head 33. The constant pressure drop is maintained by constructing the convergent section 53a of the throat 56 of the venturi 51 in such a manner that the cross-sectional area of the throat remains unchanged over the firing duration of the reaction motor. For this purpose, a laminated refractory throat insert 57 may be provided. The laminated refractory-throat insert 57 comprises a plurality of high temperature refractory metal wafers 58, 59 and 60 separated alternately by thin wafers 61 of an insulating plastic material, such as a phenolic resin. The laminated insert wafers are bonded by a low melting point adhesive 62.

The laminated insert 57 above described possesses the features of diminishing in thickness in conjunction with and at the same rate as the rocket nozzle wall 52. As the process of heat transfer through the nozzle wall 52 commences, after the reaction motor is ignited, heat is conducted through the laminated insert 57. When the melting temperature of the first or uppermost adhesive joint 62a is reached, the refractory disk 58 preceding it will be freed and the localized gas pressure will expel it from the interior of the nozzle. The heat transfer process then proceeds through the insulating plastic wafer 61 and the next refractory metal wafer 59 until the second refractory wafer 59 is unbonded and expelled. The adhesive melting temperature and plastic material of the plastic wafers are so chosen as to duplicate the rates of regressive ablation of the rocket nozzle wall 52. Thus, both the throat 56 and nozzle wall 52 regressively ablate together and therefore no surface discontinuity is presented to the primary flow of exhaust gases through the nozzle.

Thus, means are provided for supplying a portion of the exhaust gases for creating oblique shock waves changing the direction of the thrust vector of the main body of exhaust gases flowing from the rocket nozzle and means for providing a constant pressure drop across the valve means controlling flow of the by-passed exhaust gases.

In addition to providing the gas flow passage, the housing 31 of the thrust control device defines a pressurization chamber 70 and seal chambers 71 and 72 communicating therewith through passages 73 and 74 formed in the divider walls 75 and 76. As appears in FIGURES 2 and 3, the axial flow tubes 42 are provided with by-pass outlets 77 which communicate through the outer sleeve 34 with chamber 70, thus providing means for supplying the pressurizing medium from the plenum chamber 45. Carried by the sleeve 34 in the chamber 70 is an annular flange 79 which has attached thereto a bellows seal 80. The bellows seal 80 is connected at its other end as at 82 to a stationary member 82a connected to the end cap 83 of the housing 31. The bellows seal means prevent passage of the pressurizing medium into the interior thereof from chamber 70. The wall 82a of the end cap 83 is passaged as at 84 and communicates the interior of the bellows with a conduit 85 connected as at 86 to a control valve 87, the operation of which is more fully hereinafter described. Thus, by flowing the cooling medium, such as nitrogen gas, from a source such as a pressurized vessel 88 through a conduit 89 to the control valve 87 the coolant gas may be flowed through conduit 85, passage 84 into the interior of the bellows 80 moving the flange 79 and attached piston to the closed position as shown by the dotted lines in FIGURE 2.

Reciprocal movement of the plunger is facilitated by an annular labyrinth seal 91 positioned in chamber 71. The seal 91 restricts flow therearound increasing the cooling effect adjacent the seat 48 and providing support for the plunger assembly adjacent the hot gas inlet 30. The seal therefore provides support for the plunger and minimizes the possibility of sticking thereof during transition from the open and closed positions. A second labyrinth seal 92 surrounds the plunger in chamber 72. This seal 92 cooperates with the seal 91 in supporting the plunger assembly and minimizing the possibility of sticking thereof during the transition from open and closed positions. The seal 92 restricts the flow of the coolant gas in one direction from the plenum chamber 45 into the pressurization chamber 70 and vice versa, depending, of course, on the position of the plunger assembly.

Thus seals 91 and 92 cooperate to provide a uniform radial pressure acting on the plunger assembly which supports the assembly without physical contact between the walls of the housing 31 and the plunger assembly and prevent the possibility of sticking.

In operation, the plunger head 33 is positioned as shown permitting passage of the hot exhaust gases from the inlet 30. The plunger is maintained in this position by the nitrogen gas which is supplied from the source 88 through the control valve 87 into the plenum chamber 45. From the plenum chamber 45 the nitrogen gas flows through the axial tubes 42 and through the transverse passages 77 into the pressurizing chamber 70. Pressure forces acting in the chamber 70 on the flange 79 hold the flange 79 in the position shown in FIGURE 3 with the bellows in the distended position. A portion of the gases pass from the chambers 70 through the annular passage 73 into chamber 71 for pressurizing the seal 91. Similarly, a portion of the gases from the plenum chamber 45 pass into chamber 72 for pressurizing of the seal 92. The plunger then is maintained from contact with the walls of the housing 31. The main body of exhaust gases flowing through the axial tubes 42 flow into the annular passage 35a adjacent the head 33 of the plunger and pass through the orifices 46 at sonic velocities. The nitrogen gas is heated in chamber 35a and from the orifices 46 pass axially back and away from the tip of the plunger head 33, thus augmenting the boundary layer of gases created by the flow of the hot exhaust gases over the plunger which flow from the inlet 30.

Movement of the plunger assembly to block passage of the exhaust gases from flowing into passage 49 from inlet passage 30 is accomplished by directing the low temperature gas, such as nitrogen, from the source 88 through the valve control device 87. The valve control device 87 communicates the source 88 with conduit 85 which introduces the supply of exhaust gases under pressure into the interior of the bellows seal 80 through passage 84. The pressure therefore in chamber 70 is reduced while the pressure increases in the interior of the bellows seal means 80. A force therefore is exerted on the bellows mounting flange 79 which causes the plunger head 33 to move towards the valve seat 48. As the plunger head 33 approaches the valve seat 48, the flow area of the cooling gases escaping from the orifices 46 is reduced, thus restricting the mean orifice flow. A back pressure therefore is built up between the valve seat and nozzle head 33 which causes an increase in flow to chamber 70 through the passages 73 of the axial tubes 42 and consequently a pressure in chamber 70 which produces a deccelerating force on the bellows flange 79 which is proportional to the gap "G" shown in FIGURE 2 between the valve seat and plunger head 33.

Equilibrium pressure in chambers 70 and bellows 80 is obtained at a position where the gap "G" is incrementally small. Thus, the valve head 33 approaches but does not contact the valve seat 48, thereby eliminating the possibility of shock loading of the plunger assembly and minimizing the sticking problem between the valve seat and plunger head. In the position of pressure equilibrium, the cooling gases continue to flow through the orifices 46 establishing a pressure gradient between the plunger head 33 and the valve seat 48 such that flow from the inlet 30 into the outlet 49 is terminated. The axially and rearwardly flowing cooled gases flow through the gap "G" into the downstream section of the flow passage 49. In the equilibrium position, the pressures in the bellows 80 and chamber 70 are substantially equal to that in the plenum chamber 45 and thus flow does not occur through the seal chamber 72 housing seal 92. However, pressure in chamber 70 is greater than in outlet 49 because of the fixed restrictions in the axial tubes 42 and thus flow will occur through chamber 71 thereby providing adequate pressure within the chamber to support the valve plunger assembly.

To return the valve to the open position, the control valve 87 is actuated to connect the bellows seal conduit 85 to atmosphere. The low temperature nitrogen gas pressure in chamber 70 acts on the bellows support flange 79 thereby distending the bellows seal means 80 and forcing the nitrogen gas from the conduit 85 to atmosphere. As the flange 79 moves rearward as shown in FIGURE 2, the gap distance "G" between the valve seat and plunger head 33 increases and thereby the cooling gas flow rate through the orifices 46 increases accordingly. It will be appreciated that as the flow rate of the cooling gases increases, the wall temperature of the refractory plunger head remains stabilized as the rate of flow around the refractory plunger head 33 increases. Thus, as the cooling flow around the refractory head increases, a corresponding decrease in flow to chamber 70 occurs accompanied by a corresponding decrease in the force applied to flange 79. The pressure in chamber 71 when the valve is in the open position is sufficient to produce an outflow of gas through the seal chamber 71 thereby preventing the entry of hot exhaust gases from the inlet 30 into the chamber 71 and thereby cooling the seal 91.

As appears in FIGURE 1, a plurality of the thrust control valve devices 25 may be positioned at locations 180° apart to provide changes in the thrust vector (FIGURE 6) in the yaw planes and a pair of the thrust control valve devices 25 may be positioned on the nozzle 13 to control movement thereof in the pitch plane. It will be appreciated that the valve devices 25 will be selectively actuated by the auto pilot system of the vehicle with which associated to provide the correct directional change in the thrust vector of the primary flow of exhaust gases flowing from the nozzle 13 as appears in FIGURE 6.

The thrust control device 25 may supply through a manifold arrangement a plurality of inlets 51 or, as shown in FIGURE 4, a plurality of thrust control valve devices 25 may be utilized to control more precisely the degree of directional change of the thrust vector of the exhaust gases flowing through the nozzle 13. It will be appreciated that the auto pilot system of the vehicle may selectively energize the required number of thrust control valve devices 25 to obtain the desired degree of directional change in the thrust vector of the primary flow of exhaust gases through the nozzle.

The nozzle entrance portion 12 is sized to the wall 12a of the reaction chamber 11 to provide a ball and socket joint thereby permitting swiveling or gimbal movement of the nozzle 13. An annular seal 17 may be provided to prevent gas leakage between the nozzle and reaction chamber wall 12a.

The exhaust nozzle 13 is of the De Laval type and may be secured in a gimbal arrangement 18 which clearly appears in FIGURE 5. The gimbal arrangement 18 includes an annular ring 19 pinned as at 20 and 21 to the nozzle 13 at an appropriate location, such as the throat 14 thereof, for movement of the nozzle in the pitch plane which is the verical plane as appears in FIGURE 5. The ring 19 is pinned as at 22 and 23 for oscillation in a semi-circular ring 24 which is secured as at 24a to the wall of the nozzle exit portion 10. Ring 24 permits movement of the nozzle in the yaw plane.

Thus, by the application of a directional force to the reaction motor nozzle, the thrust vector direction of a nozzle exhaust gases may be changed to thereby control the attitude of the vehicle in both the pitch and yaw planes.

Thus, with my invention, I provide means for controlling the direction of the thrust vector of the primary flow of exhaust gases discharging from a reaction motor nozzle with valve means incorporating a cooling feature by flowing cooling gases around the nozzle which subsequently mix with hot filtered exhaust gases, the mixture of which is subsequently employed to create transverse or oblique shock waves in the primary flow of exhaust gases to control the attitude of the vehicle in the pitch and yaw planes.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A system adapted to control the attitude of air and space borne vehicles propelled by the thrust produced by exhaust gases generated in a reaction motor and discharging through an exhaust nozzle comprising: means communicating an outlet port formed in the nozzle wall with a plurality of second ports formed in the nozzle wall downstream of the outlet port for supplying a portion of exhaust gases in an obliquely impinging stream on the primary body of exhaust gases flowing through the nozzle to thereby cause changes in the direction of the thrust vector of the primary body of flowing exhaust gases and to control the attitude of the vehicle in the pitch and yaw planes, means for filtering the exhaust gases between said outlet port and said second ports, said second ports containing a laminated port insert seated in a groove formed in the nozzle wall and capable of regressively ablating at substantially the same rate as the nozzle wall, said insert including a plurality of disks of refractory material, a plurality of disks of insulating plastic material interposed between the refractory disks and bonded by a low temperature adhesive, and a passage formed through the disks, valve means for mixing a cooling fluid with the exhaust gases before supplying thereof to the second ports having a housing having a valve chamber, an inlet to the valve chamber for supplying a high temperature fluid to the chamber, an outlet for the valve chamber, a valve seat formed in the inlet, a movable valve assembly in the valve chamber including a valve head carried adjacent the valve seat and a valve body, apertures in the valve heads for flowing said cooling fluid from the valve assembly into the valve chamber adjacent the valve seat for mixture with a high temperature fluid flowing into the chamber to cool the high temperature fluid in the valve head, and means for moving the valve assembly toward and away from the valve seat in response to a signal received from a remote source to selectively control flow to said second port.

2. An ablative laminated refractory wall insert for a rocket nozzle wall and the like, adapted to be inserted in a groove surrounding an aperture in said nozzle wall, said insert including a plurality of disks of refractory material bonded by a low temperature adhesive, said disks being seated in said groove and surrounding said aperture and adapted for regressive ablation at substantially the same rate as the adjacent nozzle wall so that surface continuity is presented to the flow of exhaust gases through the nozzle.

3. An ablative laminated port insert adapted for seating in a groove surrounding an aperture formed in a rocket nozzle wall and capable of regressively ablating at substantially the same rate as the adjacent nozzle wall so that surface continuity is presented to the flow of exhaust gases through the nozzle, said insert including a plurality of disks of refractory material, a plurality of disks of insulating plastic material interposed between the refractory disks and bonded by a low temperature adhesive, and a passage formed through the disks.

4. A valve device adapted for cooling and controlling flow of high temperature fluids comprising: a housing having a valve chamber, an inlet to the valve chamber for supplying a high temperature fluid to the chamber, an outlet for the valve chamber, a valve seat formed in the inlet, a reciprocable valve assembly in the valve chamber including an outer valve head carried adjacent the valve esat and an outer valve body, an inner valve body carrying an inner valve head in space relation to the outer valve head, means supporting the inner valve body and head including a wall separating the space between the inner and outer valve heads into a chamber, a plurality of tubes disposed in the space between the valve outer and inner bodies communicating at one end with the chamber defined by the inner and outer valve heads, a series of annularly arranged bleed ports formed in the outer valve head for flowing a cooling medium from the valve assembly adjacent the valve seat for mixture with a high temperature fluid flowing into the valve chamber and for cooling the high temperature fluid and the valve head, a pressurization chamber, an annular flange carried by the outer valve body in the pressurization chamber for separating the chamber into opposed pressurizable compartments, pressurizable bellows seal means carried in one of said compartments by the flange and connected to the end wall of the compartment, a by-pass outlet formed in at least one of the tubes for supplying a portion of the cooling medium to the compartment opposite the compartment containing the bellows seal means, a plenum chamber for supplying a cooling pressurized medium to the tubes, conduit means for supplying the pressurizing medium to the interior of the bellows seal means for moving the valve assembly towards the valve seat, means controlling flow to the tubes and interior of said bellows seal means, and means supporting the valve assembly in the housing from contact with the walls of the valve chamber including labyrinth seals.

References Cited in the file of this patent

UNITED STATES PATENTS

| | | |
|---|---|---|
| 691,975 | Schaaf | Jan. 28, 1902 |
| 1,067,891 | Wagner | July 22, 1913 |
| 1,209,673 | Coggin | Dec. 26, 1916 |
| 2,254,472 | Dahl | Sept. 2, 1941 |
| 2,305,724 | Luetzelschwab | Dec. 22, 1942 |
| 2,366,969 | Kiggins | Jan. 9, 1945 |
| 2,444,703 | Jones | July 6, 1948 |
| 2,447,200 | Miller | Aug. 17, 1948 |
| 2,575,875 | Johnson | Nov. 20, 1951 |
| 2,620,893 | Holt et al. | Dec. 9, 1952 |
| 2,738,854 | Thrower | Mar. 20, 1956 |
| 2,793,493 | Kadosch et al. | May 18, 1957 |
| 2,875,578 | Kadosch et al. | Mar. 3, 1959 |
| 2,916,873 | Walker | Dec. 15, 1959 |
| 3,020,709 | Bertin et al. | Feb. 13, 1962 |

FOREIGN PATENTS

| | | |
|---|---|---|
| 1,057,271 | France | Oct. 28, 1953 |